United States Patent
Do et al.

(10) Patent No.: US 8,346,840 B2
(45) Date of Patent: Jan. 1, 2013

(54) FLEXIBLE ACCUMULATOR FOR RATIONAL DIVISION

(75) Inventors: Viet Linh Do, Carlsbad, CA (US); Simon Pang, San Diego, CA (US)

(73) Assignee: Applied Micro Circuits Corporation, San Diego, CA (US)

(*) Notice: Subject to any disclaimer, the term of this patent is extended or adjusted under 35 U.S.C. 154(b) by 1419 days.

(21) Appl. No.: 11/954,325

(22) Filed: Dec. 12, 2007

(65) Prior Publication Data

US 2009/0157791 A1 Jun. 18, 2009

(51) Int. Cl.
*G06F 7/52* (2006.01)

(52) U.S. Cl. ........................ 708/653; 708/650

(58) Field of Classification Search ................ None
See application file for complete search history.

(56) References Cited

U.S. PATENT DOCUMENTS

| | | | | |
|---|---|---|---|---|
| 4,078,203 A | * | 3/1978 | Borst | 377/47 |
| 4,991,188 A | * | 2/1991 | Perkins | 377/49 |
| 5,255,213 A | * | 10/1993 | Wasserman | 708/103 |
| 5,781,459 A | * | 7/1998 | Bienz | 708/271 |
| 6,060,936 A | * | 5/2000 | Raghunath | 327/360 |

OTHER PUBLICATIONS

Kozak et al., "A Pipelined Noise Shaping Coder for Fractional-N Frequency Synthesis", IEEE Transactions on Instrumentation and Measurement, vol. 50, No. 5, Oct. 2001, 1154-1161.

* cited by examiner

*Primary Examiner* — Michael D Yaary

(57) ABSTRACT

A system and method are provided for rational division. The method accepts accepting a binary numerator and a binary denominator. A binary first sum is created of the numerator and a binary first count from a previous cycle. A binary first difference is created between the first sum and the denominator. In response to comparing the first sum with the denominator, and first carry bit is generated and added to a first binary sequence. The first binary sequence is used to generate a k-bit quotient. Typically, the denominator value is larger than the numerator value. In one aspect, the numerator and denominator form a rational number. Alternately, the numerator may be an n-bit bit value formed as either a repeating or non-repeating sequence, and the denominator is an (n+1)-bit number with a decimal value of $2^{(n+1)}$.

24 Claims, 7 Drawing Sheets

| Mode | total_contribution[4:0] | total_contribution values |
|---|---|---|
| First Order | $contribution1 = c_1[n]$ | 0,1 |
| Second Order | $contribution1 + contribution2 = c_1[n] + c_2[n] - c_2[n-1]$ | -1,0,1,2 |
| Third Order | $contribution1 + contribution2 + contribution3 =$ $c_1[n] + c_2[n] - c_2[n-1] + c_3[n] - 2c_3[n-1] + c_3[n-2]$ | -3,-2,-1,0,1,2,3,4 |
| Fourth Order | $contribution1 + contribution2 + contribution3 + contribution4 =$ $c_1[n] + c_2[n] - c_2[n-1] + c_3[n] - 2c_3[n-1] + c_3[n-2] +$ $c_4[n] - 3c_4[n-1] + 3c_4[n-2] - c_4[n-3]$ | -7,-6,-5,-4,-3,-2, -1,0,1,2,3,4,5,6,7,8 |

*FIG. 2*
*(Prior Art)*

FLEXIBLE ACCUMULATOR FOR RATIONAL DIVISION

BACKGROUND OF THE INVENTION

1. Field of the Invention

This invention generally relates to a frequency synthesis system and, more particularly, to a system and method to support either rational or irrational number frequency division.

2. Description of the Related Art

FIG. 1 is a schematic block diagram depicting an accumulator circuit capable of performing a division operation prior art). As noted in "A Pipelined Noise Shaping Coder for Fractional-N Frequency Synthesis", by Kozak et al., IEEE Trans. on Instrumentation and Measurement, Vol. 50, No. 5, October 2001, the depicted $4^{th}$ order device can be used to determine a division ratio using an integer sequence.

The carry outs from the 4 accumulators are cascaded to accumulate the fractional number. The carry outs are combined to reduce quantization noise by adding their contributions are follows:

contribution $1=c1[n]$;

contribution $2=c2[n]-c2[n-1]$;

contribution $3=c3[n]-2c3[n-1]+c3[n-2]$;

contribution $4=c4[n]-3c4[n-1]+3c4[n-2]-c4[n-3]$;

where n is equal to a current value, and (n−1) is the previous value.

FIG. 2 shows the contributions made by the accumulator depicted in FIG. 1 with respect to order (prior art). A fractional number is a number that expresses a ratio of a numerator divided by a denominator. Some fractional numbers are rational—meaning that the numerator and denominator are both integers. With an irrational number, either the numerator or denominator is not an integer (e.g., $\pi$). Some rational numbers cannot be resolved (e.g., 10/3), while other rational numbers may only be resolved using a large number of decimal (bit) places. In these cases, or if the fractional number is irrational, a long-term mean of the integer sequence must be used as an approximation.

It would be advantageous if a division circuit existed where the quotient could be obtained by using a dividend and divisor ratio that is a rational number. It would advantageous if the above-mentioned division circuit could also operate with a dividend and divisor expressed as an irrational number.

SUMMARY OF THE INVENTION

In frequency synthesis applications, there is often a need to use a single reference frequency (or input frequency) to create multiple output frequencies, where the ratio between output frequency and reference frequency is a fractional number. The present invention accumulator permits the use of a true rational number as the dividend and divisor, to avoid the use of approximations when the rational number can only be resolved (forming a repeating sequence) using a large number of bit places. Advantageously, the present invention is able to operate in a conventional fractional division mode, if necessary.

Accordingly, a method is provided for rational division. The method accepts accepting a binary numerator and a binary denominator. A binary first sum is created of the numerator and a binary first count from a previous cycle. A binary first difference is created between the first sum and the denominator. In response to comparing the first sum with the denominator, a first carry bit is generated and added to a first binary sequence. The first binary sequence is used to generate a k-bit quotient.

More explicitly, a binary "1" first carry bit is generated if the first sum is greater than the denominator, and a binary "0" first carry bit is generated if the first sum is less than or equal to the denominator. In response to comparing the first sum to the denominator, the first count for a subsequent cycle is generated as follows. The first difference is used as the first count if the first sum is greater than the denominator, and the first sum is used as the first count if the first sum is less than or equal to the denominator.

In the same manner, the first count from a previous cycle may be accepted along with a binary second count from the previous cycle. A binary second sum is created of the first count and the second count, and a binary second difference is created between second sum and the denominator. In response to comparing the second sum with the denominator, a second carry bit is generated and added to a second binary sequence. Then, the first and second binary sequences are used to generate the k-bit quotient.

Typically, the denominator value is larger than the numerator value. In one aspect, the numerator and denominator form a rational number. Alternately, the numerator may be an n-bit bit value formed as either a repeating or non-repeating sequence, and the denominator is an (n+1)-bit number with a decimal value of $2^{(n+1)}$.

Additional details of the above-described method and system for rational division are presented below.

BRIEF DESCRIPTION OF THE DRAWINGS

FIG. 2 shows the contributions made by the accumulator depicted in FIG. 1 with respect to order (prior art).

DETAILED DESCRIPTION

Figure 1:
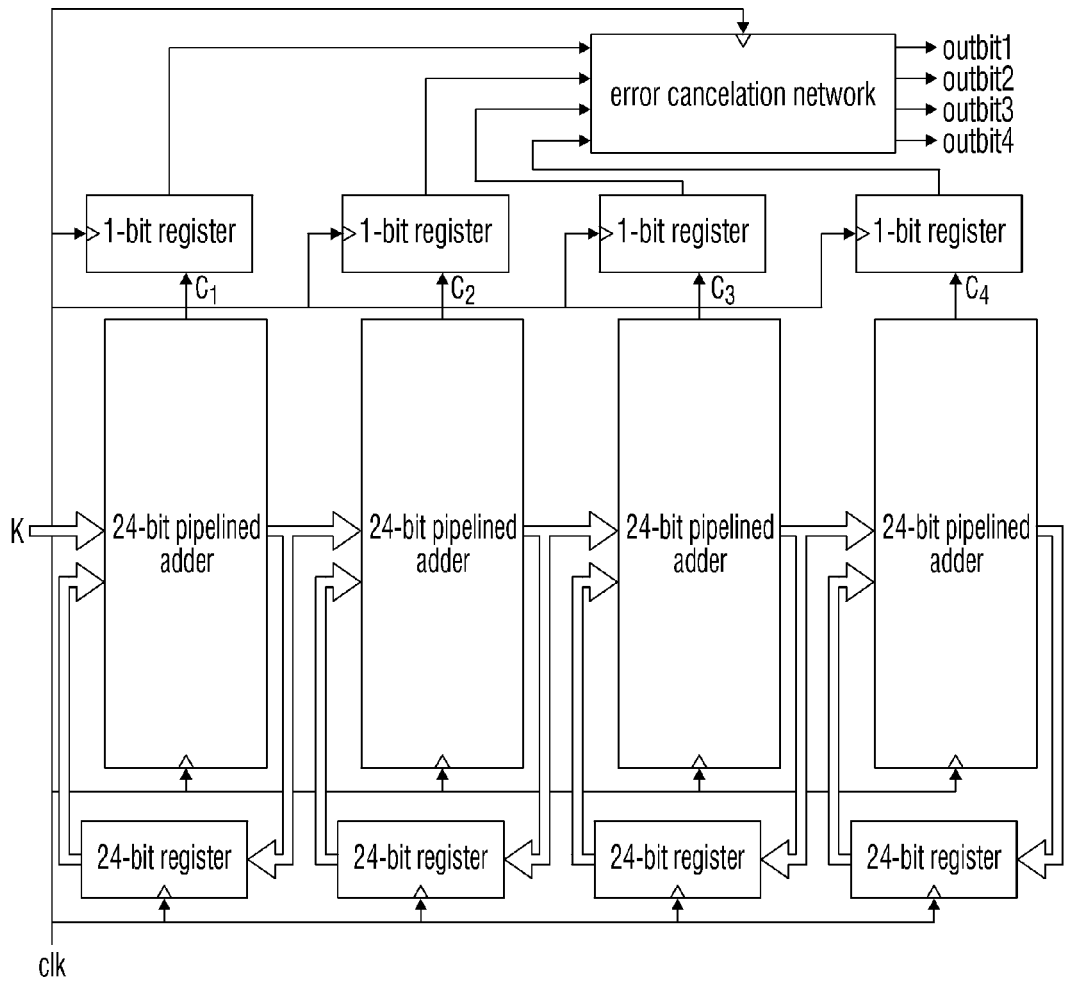
FIG. 1 is a schematic block diagram depicting an accumulator circuit capable of performing a division operation (prior art).

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "processor", "processing device", "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

The various illustrative logical blocks, modules, and circuits that have been described may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the node, or elsewhere. In the alternative, the processor and the storage medium may reside as discrete components in the node, or elsewhere in an access network.

Figure 3:
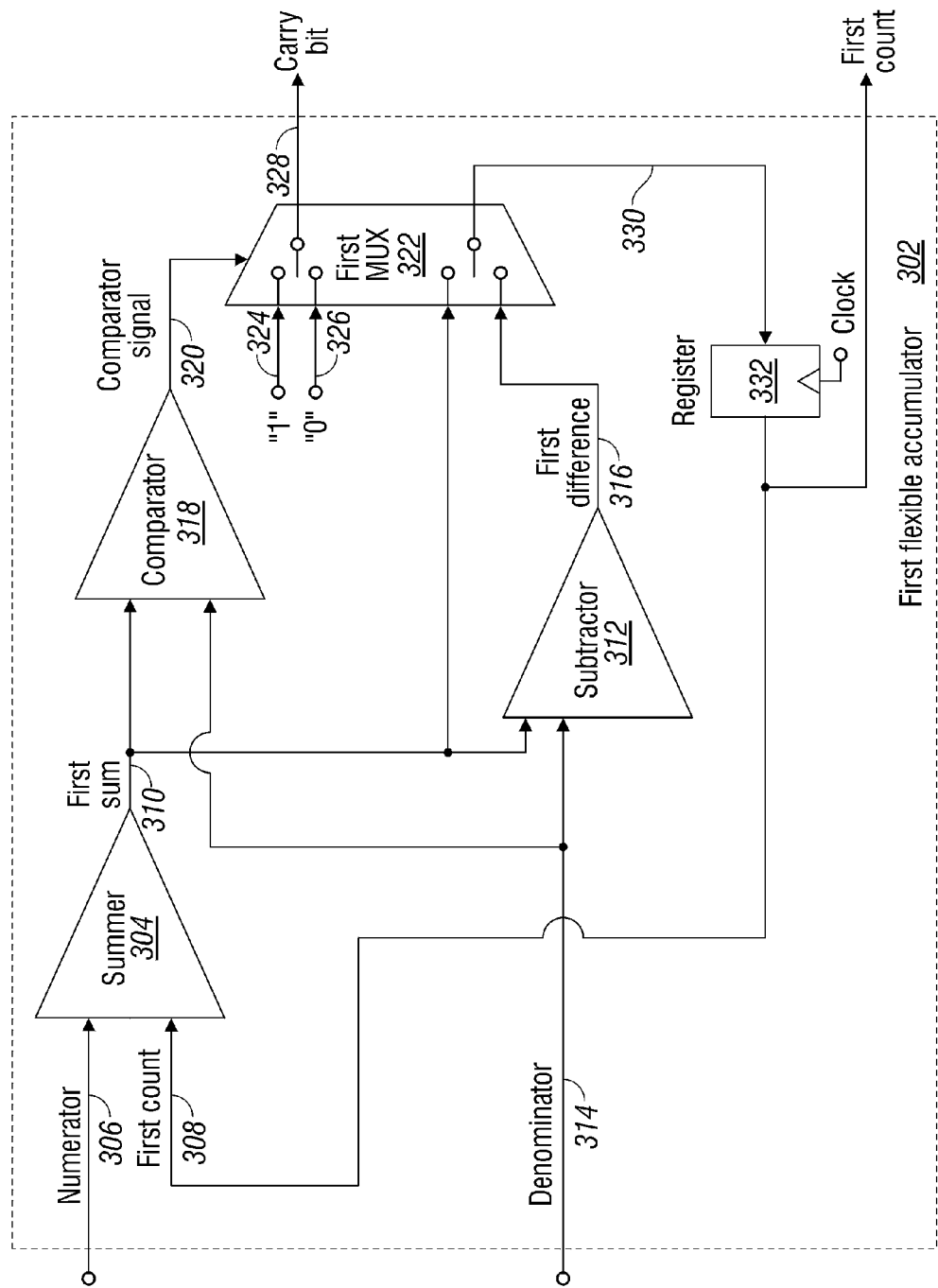
FIG. 3 is a schematic block diagram depicting a system for rational division.

FIG. 3 is a schematic block diagram depicting a system for rational division. As explained in more detail below, system 300 is called a rational division system because a numerator (dividend) and denominator (divisor) are used that form a true rational number. That is, the numerator and denominator are integer inputs to the system. Alternately stated, the system input need not be a quotient derived from a numerator and denominator. The system 300 comprises a first flexible accumulator 302 including a first summer 304 having an input on line 306 to accept a binary numerator. Summer 304 has an input on line 308 to accept a binary first count from a previous cycle and an output on line 310 to supply a binary first sum of the numerator and the first count.

A first subtractor 312 has an input on line 314 to accept a binary denominator, an input on line 310 to accept the first sum, and an output on line 316 to supply a binary first difference between the first sum and the denominator. A first comparator 318 has an input on line 310 to accept the first sum, an input on line 314 to accept the denominator, and an output on line 320 to supply a first comparator signal. A first multiplexer (MUX) 322 has an input to accept carry bits. A "1" carry bit is supplied on line 324 and a "0" carry bit is supplied on line 326. The MUX 322 has a control input on line 320 to accept the first comparator signal, and an output on line 328 to supply a first carry bit in response to the first comparator signal.

More explicitly, the first MUX 322 supplies a binary "1" first carry bit on line 328 if the first comparator signal on line 320 indicates that the first sum is greater than the denominator. The MUX 322 supplies a binary "0" first carry bit if the first comparator signal indicates that the first sum is less than or equal to the denominator. The first MUX 322 has an input on line 310 to accept the first sum, input on line 316 to accept the first difference, and an output on line 330 to supply the first count in response to the comparator signal. Note: the first count from first MUX 322 on line 330 becomes the first count from a subsequent cycle on line 308 after passing through clocked register or delay circuit 332. As explained in more detail below, line 308 may also connected as an output port (count) to another, higher order flexible accumulator.

The first MUX 322 supplies the first difference as the first count on line 308 for the subsequent cycle if the first comparator signal indicates that the first sum is greater than the denominator. The first MUX 322 supplies the first sum as the first count in the subsequent cycle if the first comparator signal indicates that first sum is less than or equal to the denominator. Alternately but not shown, the accumulator may be comprised of two MUX devices, one for selecting the carry bit and one for selecting the first count.

In one aspect, the first summer accepts an n-bit binary numerator on line 306, an n-bit first count on line 308 from the previous cycle, and supplies an (n+1)-bit first sum on line 310. The first subtractor 312 accepts an (n+1)-bit binary denominator on line 314 and supplies an n-bit first difference on line 316.

Typically, first summer 304 accepts the numerator with a value, and the first subtractor 312 accepts the denominator with a value larger than the numerator value. In one aspect, the combination of the numerator and denominator form a rational number. That is, both the numerator and denominator are integers. However, the numerator and denominator need not necessarily form a rational number. Alternately expressed, the first summer 304 may accept an n-bit numerator that is a repeating sequence of binary values, or the numerator may be the most significant bits of a non-repeating sequence. The non-repeating sequence may represent an irrational number or a rational number that cannot be resolved (does not repeat) within a span of n bits. In this aspect, the first subtractor 312 accepts an (n+1)-bit denominator with a value equal to decimal $2^{(n+1)}$.

Figure 4:
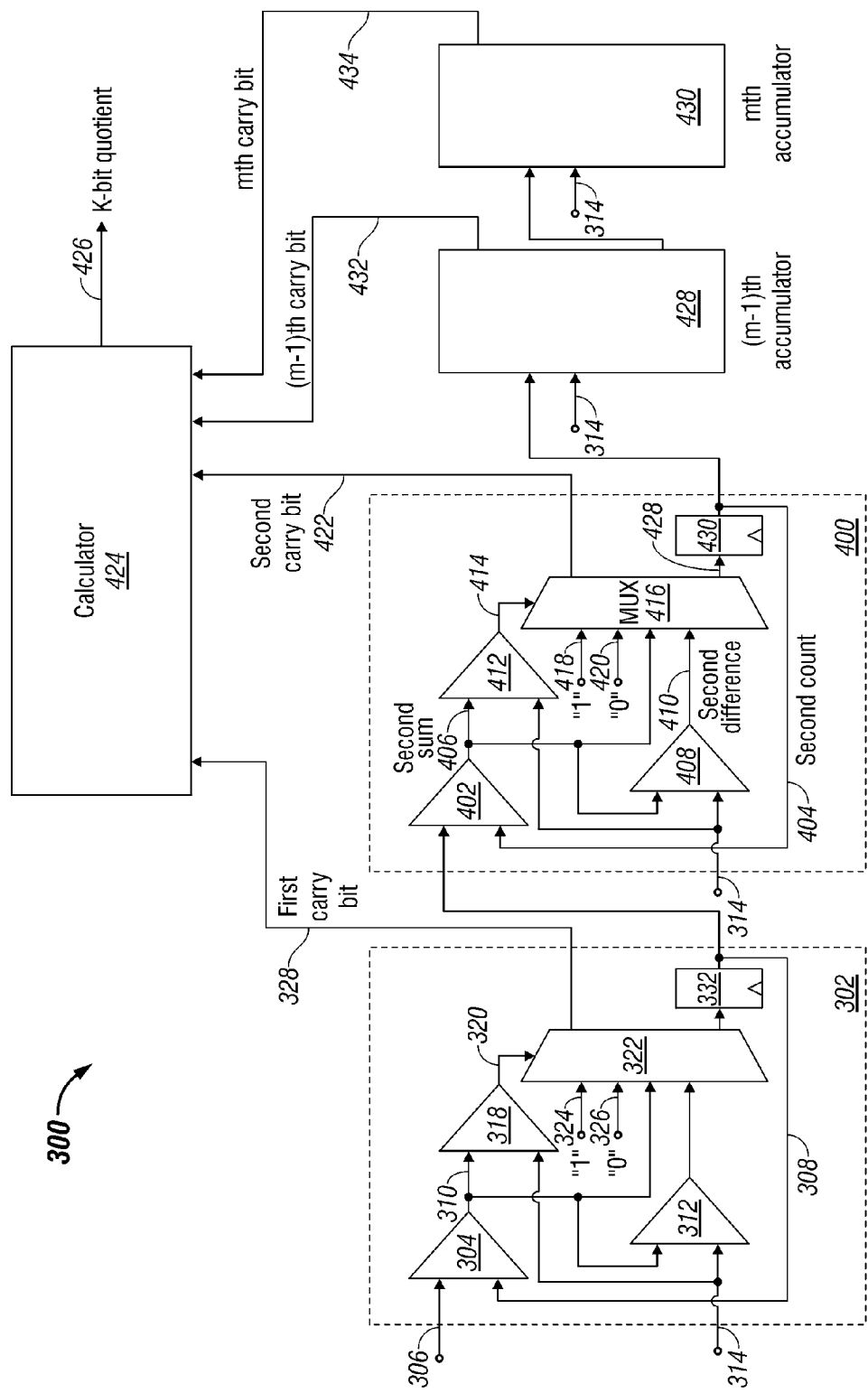
FIG. 4 is a schematic block diagram depicting a multi-order system of accumulators.

FIG. 4 is a schematic block diagram depicting a multi-order system of accumulators. A second flexible accumulator 400 includes a second summer 402 having an input on line 308 to accept the first count from a previous cycle, an input on line 404 to accept a second count from the previous cycle, and an output on line 406 to supply a binary second sum of the first count and the second count. A second subtractor 408 has an input on line 314 to accept the denominator, an input on line 406 to accept the second sum, and an output on line 410 to supply a binary second difference between the second sum and the denominator.

A second comparator 412 has an input on line 406 to accept the second sum, an input on line 314 to accept the denominator, and an output on line 414 to supply a second comparator signal. A second MUX 416 has inputs on lines 418 and 420 to accept the "1" and "0" carry bits, respectively. The MUX 416 has a control input on line 414 to accept the second comparator signal, and an output on line 422 to supply a second carry bit in response to the second comparator signal. As with the first accumulator 302, the second MUX 416 supplies a binary "1" first carry bit if the second comparator signal indicates that the second sum is greater than the denominator, and supplies a binary "0" first carry bit if the second comparator signal indicates that the second sum is less than or equal to the denominator. The second MUX 416 has an input on line 406 to accept the second sum and input on line 410 to accept the second difference. The second MUX 416 has an output on line 404 to supply the second difference as the second count for the subsequent cycle if the second comparator signal indicates that the second sum is greater than the denominator. The second MUX 416 supplies the second sum as the second count in the subsequent cycle if the second comparator signal indicates that second sum is less than or equal to the denominator. Note: the second count from second MUX 416 on line 428 becomes the second count from a subsequent cycle on line 404 after passing through clocked register or delay circuit 430. Line 404 is also shown connected as an output port (count) to another, higher order flexible accumulator.

A calculator 424 has an input on line 328 to accept the first binary sequence, an input on line 422 to accept the second binary sequence, and an output on line 426 to supply a k-bit quotient generated from the first and second binary sequences. In total, the system 300 comprises m flexible accumulators, including an (m−1)th accumulator 428 and an mth accumulator 430. In this example, m=4. However, the system 300 is not limited to any particular number of flexible accumulators. Thus, the calculator has inputs 328, 422, 432, and 434 to accept m=4 binary sequences and the output 426 supplies a k-bit quotient generated from the m binary sequences. In one aspect, the calculator 424 derives the quotient as shown in FIGS. 1 and 2, and as explained below.

A fourth order system, using four series connected accumulators has been depicted as an example. However, it should be understood that the system is not limited to any particular number of accumulators. Although the above-described values have been defined as binary values, the system could alternately be explained in the context of hexadecimal or decimal numbers. Although the system 300 has been depicted as a combination of connected hardware elements, some aspects parts of the system may be enabled using software instructions stored in memory that are called and performed by a processor or logic-coded state machine device (not shown).

Functional Description

Figure 5:
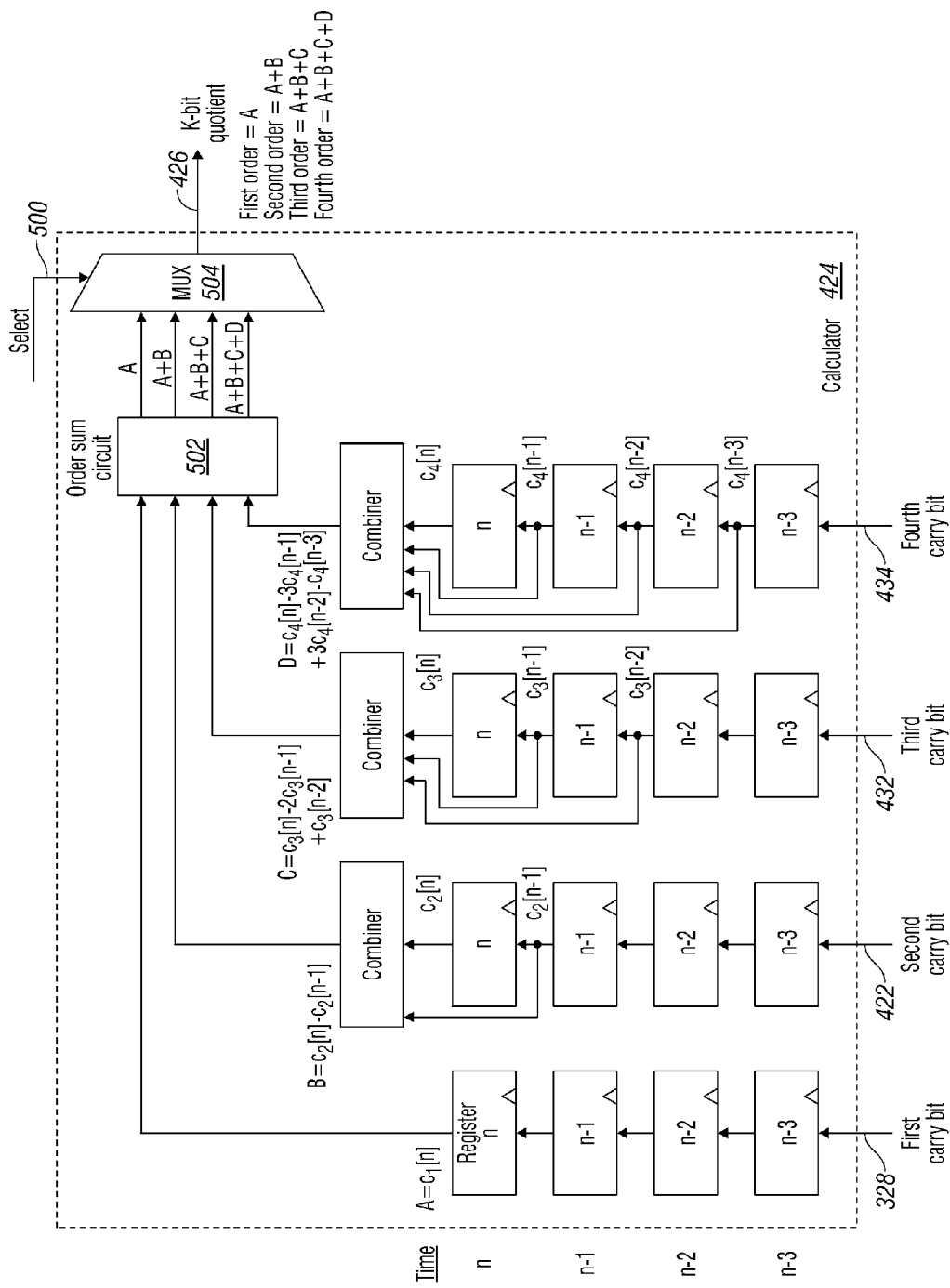
FIG. 5 is a schematic block diagram depicting the calculator of FIG. 4 in greater detail.

FIG. 5 is a schematic block diagram depicting the calculator of FIG. 4 in greater detail. Returning to the calculation of the quotient, the number of bits required from each contribution block is different. From FIG. 2 it can see that each order requires a different number of bits. For example, the first contribution (contributions) has only two values: 0 and 1. So, only 1 bit is needed. There is no need for a sign bit, as the value is always positive. The second contribution has possible 4 values: −1, 0, 1, and 2. So, 3 bits are needed, including 1 sign bit. The third contribution has 7 values: −3 to 4. So, 4 bits are required, including 1 sign bit. The fourth contribution has 15 values: −7 to 8. So, 5 bits are required, including 1 sign bit.

To generalize for "k" (the k-bit quotient), Pascal's formula may be used to explain how many bits is necessary for each contribution (or order). For an m-order calculator, there are m flexible accumulators and m binary sequences. Each binary sequence (or carry bit) is connected to the input of one of the m sequences of shift registers. Thus, there are m signals combined from the m shift register sequences, corresponding to the m-binary sequences (or m-th carry bit) found using Pascal's formula. A 4-order calculator is shown in FIG. 5, with 4 shift register (delay) sequences, with each shift register sequence including 4 shift registers.

As a simplified alternative, each contribution may be comprised of the same number of bits, k, which is the total contribution (or order) for all contributions. These k-bit contributions are 2 complement numbers. In FIG. 2, k is equal to 5 bits [4:0].

The accumulator does not generate a sign bit. However, the carry outs from the accumulators are modulated in the calculator and the sign bit is generated. For example, the $2^{nd}$ order contribution=$c2[n]-c2[n-1]$. If $c2[n]=0$ and $c2[n-1]=1$, then the $2^{nd}$ order contribution=$0-1=-1$. Similarly, the third order contribution=$c3[n]-2c3[n-1]+c3[n-2]$. If $c3[n]=0$, $c3[n-1]=1$, and $c3[n-2]=0$, then the $3^{rd}$ order contribution=$0-2\times1+0=-2$. For the $4^{th}$ order contribution=$c4[n]-3c4[n-1]+3c4[n-2]-c4[n-3]$. If $c4[n]=0$, $c4[n-1]=1$, $c4[n-2]=0$, and $c4[n-3]=1$, then the $4^{th}$ order contribution=$0-3\times1+3\times0-1=-4$. These contributions are added together in the "order sum circuit" 502 on the basis of order, and the order is chosen using MUX 504 and the select signal on line 500. FIG. 5 depicts one device and method for generating a quotient from accumulator carry bits. However, the system of FIG. 4 might also be enabled using a calculator that manipulates the accumulator carry bits in an alternate methodology.

Figure 6A:
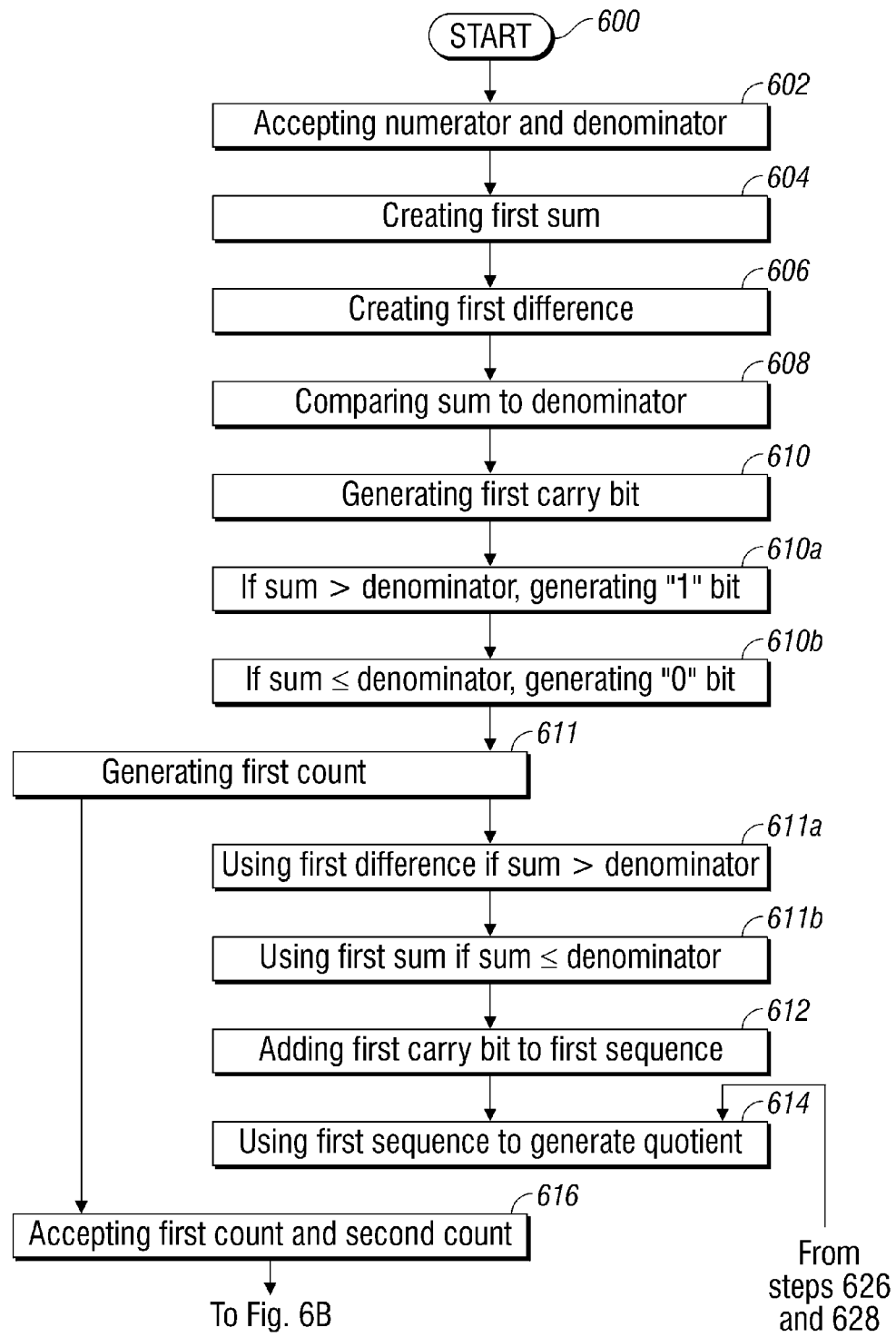
FIG. 6 is a flowchart illustrating a method for rational division.
Figure 6B:
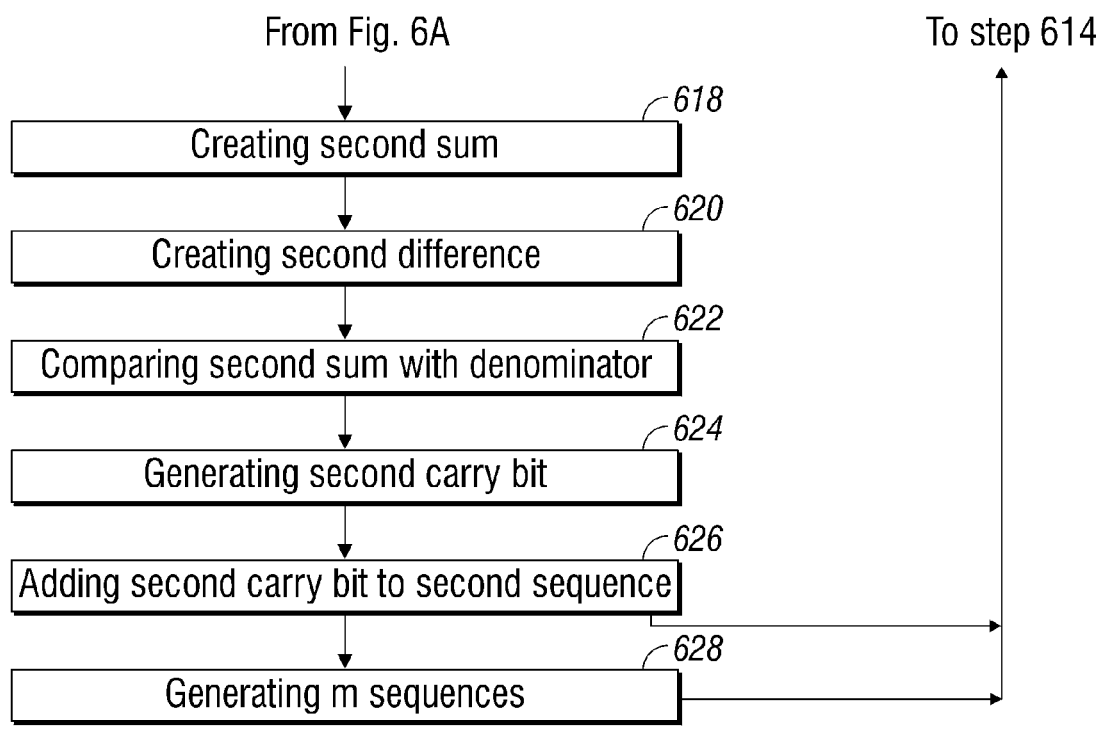

FIG. 6 is a flowchart illustrating a method for rational division. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 600.

Step 602 accepts a binary numerator and a binary denominator. Step 604 creates a binary first sum of the numerator and a binary first count from a previous cycle. Step 606 creates a binary first difference between the first sum and the denominator. Step 608 compares the first sum with the denominator. In response to the comparing, Step 610 generates a first carry bit. Also in response to comparing the first sum to the denominator, Step 611 generates the first count for a subsequent cycle. Step 612 adds the first carry bit to a first binary sequence. Step 614 uses the first binary sequence to generate a k-bit quotient.

In one aspect, generating the first carry bit in Step 610 includes substeps. Step 610a generates a binary "1" first carry bit if the first sum is greater than the denominator. Step 610b generates a binary "0" first carry bit if the first sum is less than or equal to the denominator.

In another aspect, generating the first count for the subsequent cycle in Step 611 includes substeps. Step 611a uses the first difference as the first count if the first sum is greater than the denominator. Step 611b uses the first sum as the first count if the first sum is less than or equal to the denominator.

In one aspect, accepting the numerator and the denominator in Step 602 includes accepting an n-bit binary numerator and an (n+1)-bit binary denominator. Then, the first sum created in Step 604 is an (n+1)-bit first sum of the numerator and an n-bit first count from the previous cycle. Likewise, the first difference created in Step 606 is an n-bit first difference.

In another aspect, the method generates a second order carry bit as follows. Step 616 accepts the first count from a previous cycle and a binary second count from the previous cycle. Step 618 creates a binary second sum of the first count and the second count. Step 620 creates a binary second difference between second sum and the denominator. Step 622 compares the second sum with the denominator. In response to the comparing, Step 624 generates a second carry bit. If the second sum is greater than the denominator, a binary "1" second carry bit is generated and the second difference is used as the second count for a subsequent cycle. If the second sum is less than or equal to the denominator, a binary "0" second carry bit is generated, and the second sum is used as the second count for the subsequent cycle.

Step 626 adds the second carry bit to a second binary sequence. As described in the explanation of FIGS. 2 and 5, the second carry bits are not literally added. Alternately stated, a sequence of second carry bits, upon which mathematical operations have been performed, forms the second order binary sequence. Then, generating the k-bit quotient in Step 614 includes using the first and second binary sequences to generate the k-bit quotient.

In the same manner as Steps 616 through 626 above, m orders of carry bits can be generated. For the purpose of brevity, these combined operations are represented by Step 628, which generates m binary sequences. Then, generating the k-bit quotient in Step 614 includes using the m binary sequences to generate the k-bit quotient (see the explanation of FIG. 5).

Typically, Step 602 accepts a denominator value larger than the numerator value. In one aspect, the numerator and denominator form a rational number (the numerator and denominator form a ratio of integers). Alternately, Step 602 accepts an n-bit numerator that may be either a repeating sequence or the most significant bits from a non-repeating sequence. Then, Step 602 accepts an (n+1)-bit denominator with a decimal value of $2^{(n+1)}$.

A system and method have been provided that permit a division operation to be performed using true rational numbers. Some examples of circuitry and methodology steps have been given as examples to illustrate the invention. However, the invention is not limited to merely these examples. Likewise, the invention has been described in the context of binary numbers. However, the invention is not limited to any particular number base. Other variations and embodiments of the invention will occur to those skilled in the art.

We claim:

1. A method for rational division comprising:
   a first accumulator, enabled with hardware, accepting a binary numerator and a binary denominator;
   the first accumulator creating a binary first sum of the numerator and a binary first count from a previous cycle;
   the first accumulator creating a binary first difference between the first sum and the denominator;
   the first accumulator comparing the first sum with the denominator;
   in response to the comparing, the first accumulator generating a first carry bit;
   a calculator, enabled with hardware, adding the first carry bit to a first binary sequence; and,
   the calculator using the first binary sequence to generate a k-bit quotient.

2. The method of claim 1 wherein generating the first carry bit includes:
   generating a binary "1" first carry bit if the first sum is greater than the denominator; and,
   generating a binary "0" first carry bit if the first sum is less than or equal to the denominator.

3. The method of claim 2 further comprising:
   in response to comparing the first sum the denominator, the first accumulator generating the first count for a subsequent cycle.

4. The method of claim 3 wherein generating the first count for the subsequent cycle includes:
   using the first difference as the first count if the first sum is greater than the denominator; and,
   using the first sum as the first count the first sum is less than or equal to the denominator.

5. The method of claim 4 wherein accepting the numerator and the denominator includes accepting a denominator value larger than the numerator value.

6. The method of claim 4 further comprising:
   a second accumulator, enabled with hardware, accepting the first count from a previous cycle and a second count from the previous cycle;
   the second accumulator creating a binary second sum of the first count and the second count;
   the second accumulator creating a binary second difference between second sum and the denominator;
   the second accumulator comparing the second sum with the denominator;
   if the second sum is greater than the denominator, the second accumulator:
      generating a binary "1" second carry bit; and,
      using the second difference as the second count for a subsequent cycle; and,
   if the second sum is less than or equal to the denominator, the second accumulator:
      generating a binary "0" second carry bit; and,
      using the second sum as the second count for the subsequent cycle;
   the calculator adding the second carry bit to a second binary sequence; and,
   wherein generating the k-bit quotient includes using the first binary sequence and the second binary sequence to generate the k-bit quotient.

7. The method of claim 1 wherein accepting the numerator and the denominator includes accepting an n-bit binary numerator and an (n+1)-bit binary denominator;
   wherein creating the first sum includes creating an (n+1)-bit first sum of the numerator and a n-bit first count from the previous cycle; and,
   wherein creating the first difference includes creating an n-bit first difference.

8. The method of claim 1 further comprising:
   a second accumulator, enabled with hardware, accepting the first count from a previous cycle and a binary second count from the previous cycle;
   the second accumulator creating a binary second sum of the first count and the second count;
   the second accumulator creating a binary second difference between second sum and the denominator;
   the second accumulator comparing the second sum with the denominator;
   in response to the comparing, the second accumulator generating a second carry bit;
   the calculator adding the second carry bit to a second binary sequence; and,
   wherein generating the k-bit quotient includes using the first and second binary sequences to generate the k-bit quotient.

9. The method of claim 8 further comprising:
   a plurality of m accumulators, each enabled with hardware, generating m corresponding binary sequences; and, wherein generating the k-bit quotient includes using the m binary sequences to generate the k-bit quotient.

10. The method of claim 1 wherein accepting the numerator and the denominator includes accepting the numerator and denominator as a rational number.

11. The method of claim 1 herein accepting the numerator and the denominator includes accepting an n-bit numerator selected from a group consisting of a repeating sequence and the most significant bits from a non-repeating sequence, and an (n+1)-bit denominator with a decimal value of $2^{(n+1)}$.

12. A system of hardware components used for rational division, the system comprising:
a first flexible accumulator including:
   a first summer having an input to accept a binary numerator, an input to accept a binary first count from a previous cycle, and an output to supply a binary first sum of the numerator and the first count;
   a first subtractor having an input to accept a binary denominator, and input to accept the first sum, and an output to supply a binary first difference between the first sum and the denominator;
   a first comparator having an input to accept the first sum, an input to accept the denominator, and an output to supply a first comparator signal; and,
   a first multiplexer (MUX) having an input to accept carry bits, a control input to accept the first comparator signal, and an output to supply a first carry bit response to the first comparator signal.

13. The system of claim 12 wherein the first MUX supplies a binary "1" first carry bit if the first comparator signal indicates that the first sum is greater than the denominator, and supplies a binary "0" first carry bit if the first comparator signal indicates that the first sum is less than or equal to the denominator.

14. The system of claim 13 wherein the first MUX has an input to accept the first sum, an input to accept the first difference, and an output to supply the first count for a subsequent cycle in response to the comparator signal.

15. The system of claim 14 wherein the first MUX supplies the first difference as the first count for the subsequent cycle if the first comparator signal indicates that the first sum is greater than the denominator, and supplies the first sum as the first count in the subsequent cycle if the first comparator signal indicates that first sum is less than or equal to the denominator.

16. The system of claim 15 wherein first summer accepts the numerator with a value; and,
   wherein the first subtract or accepts the denominator with a value larger than the numerator value.

17. The system of claim 12 wherein the first summer accepts an n-bit binary numerator, n-bit first count from the previous cycle, and supplies an (n+1)-bit first sum; and,
   wherein the first subtractor accepts an (n+1)-bit binary denominator and supplies an n-bit first difference.

18. The system of claim 12 further comprising:
a second flexible accumulator including:
   a second summer having an input to accept the first count from a previous cycle, an input to accept a second count from the previous cycle, and an output to supply a binary second sum of the first count and the second count;
   a second subtractor having an input to accept the denominator, and input to accept the second sum, and an output to supply a binary second difference between the second sum and the denominator;
   a second comparator having an input to accept the second sum, an input to accept the denominator, and an output to supply a second comparator signal;
   a second MUX having an put to accept carry bits, a control input to accept the second comparator signal, and an output to supply a second carry bit in response to the second comparator signal.

19. The system of claim 18 wherein the second MUX supplies a binary "1" first carry bit if the second comparator signal indicates that the second sum is greater than the denominator, and supplies a binary "0" first carry bit if the second comparator signal indicates that the second sum is less than or equal to the denominator; and,
   wherein the second MUX has an input to accept the second sum and input to accept the second difference, and an output to supply the second difference as the second count for the subsequent cycle if the second comparator signal indicates that the second sum is greater than the denominator, and supplies the second sum as the second count in the subsequent cycle if the second comparator signal indicates that second sum is less than or equal to the denominator.

20. The system of claim 18 further comprising:
a calculator having an input to accept the first binary sequence, an input to accept the second binary sequence, and an output to supply a k-bit quotient generated from the first and second binary sequences.

21. The system of claim 20 further comprising:
m flexible accumulators; and,
wherein the calculator has inputs to accept m binary sequences and the output supplies a k-bit quotient generated from the m binary sequences.

22. The system of claim 20 wherein the numerator and denominator form a rational number.

23. The system of claim 20 wherein the first summer accepts an n-bit numerator selected from a group consisting of a repeating sequence and the most significant bits of a non-repeating sequence; and,
   wherein the first subtractor accepts an (n+1)-bit denominator with a value equal to decimal $2^{(n+1)}$.

24. A flexible accumulator hardware device comprising:
a summer having an input to accept a binary numerator, an input to accept a binary count from a previous cycle, and an output to supply a binary sum of the numerator and the count;
a subtractor having an input to accept a binary denominator, and input to accept the sum, and an output to supply a binary difference between the sum and the denominator;
a comparator having an input to accept the sum, an input to accept the denominator, and an output to supply a comparator signal; and,
a multiplexer (MUX) having an input to accept carry bits, an input to accept the sum, an input to accept the difference, a control input to accept the first comparator signal, the MUX having outputs to supply a binary "1" carry bit and supply the sum as the count in a subsequent cycle if the comparator signal indicates that the sum is less than or equal to the denominator, and wherein the MUX supplies a binary "0" carry bit and supplies the difference as the count in the subsequent cycle if the comparator signal indicates that the sum is greater than the difference.

* * * * *